U S008298380B2

United States Patent
Krasnov

(10) Patent No.: US 8,298,380 B2
(45) Date of Patent: Oct. 30, 2012

(54) METHOD OF MAKING THERMALLY TEMPERED COATED ARTICLE WITH TRANSPARENT CONDUCTIVE OXIDE (TCO) COATING IN COLOR COMPRESSION CONFIGURATION, AND PRODUCT MADE USING SAME

(75) Inventor: Alexey Krasnov, Canton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1379 days.

(21) Appl. No.: 11/438,704

(22) Filed: May 23, 2006

(65) Prior Publication Data
US 2007/0275252 A1    Nov. 29, 2007

(51) Int. Cl.
*C23C 14/00*   (2006.01)
(52) U.S. Cl. ......... 204/192.29; 204/192.15; 204/192.26; 204/192.27
(58) Field of Classification Search .............. 204/192.15, 204/192.26–29
See application file for complete search history.

(56) References Cited

U.S. PATENT DOCUMENTS

| | | | |
|---|---|---|---|
| 3,388,053 A * | 6/1968 | Sinciair et. al. .......... 204/192.21 |
| 3,762,902 A | 10/1973 | Wagner et al. |
| 3,951,634 A | 4/1976 | Hall et al. |
| 3,973,942 A | 8/1976 | Coen et al. |
| 4,004,901 A | 1/1977 | Starr |
| 4,046,543 A | 9/1977 | Shields |
| 4,419,386 A | 12/1983 | Gordon |
| 4,437,872 A | 3/1984 | McMaster et al. |
| 4,443,993 A | 4/1984 | Fujiki |
| 4,456,630 A | 6/1984 | Basol |
| 4,650,921 A | 3/1987 | Mitchell |
| 4,734,381 A | 3/1988 | Mitchell |
| 4,806,220 A * | 2/1989 | Finley ....................... 204/192.27 |
| 4,873,198 A | 10/1989 | Meyers et al. |
| 4,946,491 A | 8/1990 | Barr |
| 4,999,308 A | 3/1991 | Nishiura et al. |
| 5,135,581 A | 8/1992 | Tran et al. |
| 5,232,482 A | 8/1993 | Laakso et al. |
| 5,304,499 A | 4/1994 | Bonnet et al. |
| 5,387,433 A | 2/1995 | Balian et al. |
| 5,443,609 A | 8/1995 | Lehto |
| 5,735,922 A | 4/1998 | Woodward et al. |

(Continued)

FOREIGN PATENT DOCUMENTS

JP    2001096669 A   *  4/2001

(Continued)

OTHER PUBLICATIONS

Machine Translation of Kobayashi, published on Apr. 10, 2001.*

(Continued)

*Primary Examiner* — Keith Hendricks
*Assistant Examiner* — John Brayton
(74) *Attorney, Agent, or Firm* — Nixon & Vanderhye P.C.

(57) ABSTRACT

Example embodiments of this invention relate to a method of making a thermally tempered coated article including a transparent conductive oxide (TCO) film in a color compression configuration supported by a tempered glass substrate. A coated article, that is thermally tempered and made by such a process, is also provided. Coated articles according to certain example non-limiting embodiments of this invention may be used in applications such as solar cells, oven doors, electrostatic discharge glass, solar control windows, defrosting windows, or other types of windows in certain example instances.

22 Claims, 3 Drawing Sheets

U.S. PATENT DOCUMENTS

| | | | |
|---|---|---|---|
| 5,735,923 | A | 4/1998 | Hisaeda |
| 5,755,845 | A | 5/1998 | Woodward et al. |
| 5,827,345 | A | 10/1998 | Boaz et al. |
| 5,868,871 | A | 2/1999 | Yokose et al. |
| 5,893,941 | A | 4/1999 | Nikander |
| 5,922,142 | A | 7/1999 | Wu et al. |
| 5,928,398 | A | 7/1999 | Lehto |
| 5,938,810 | A | 8/1999 | De Vries, Jr. et al. |
| 5,951,734 | A | 9/1999 | Friedel et al. |
| 5,974,834 | A | 11/1999 | Rijkens et al. |
| 6,169,246 | B1 | 1/2001 | Wu et al. |
| 6,221,495 | B1 | 4/2001 | Wu et al. |
| 6,251,701 | B1 | 6/2001 | McCandless |
| 6,261,693 | B1 | 7/2001 | Veerasamy |
| 6,395,973 | B2 * | 5/2002 | Fujisawa et al. .............. 136/256 |
| 6,436,541 | B1 * | 8/2002 | Sopko et al. ................... 428/432 |
| 6,458,673 | B1 | 10/2002 | Cheung |
| 6,509,204 | B2 | 1/2003 | Campbell |
| 6,521,825 | B2 | 2/2003 | Miura et al. |
| 6,548,751 | B2 | 4/2003 | Sverdrup, Jr. et al. |
| 6,572,782 | B2 | 6/2003 | Campo et al. |
| 6,602,606 | B1 | 8/2003 | Fujisawa et al. |
| 6,703,555 | B2 | 3/2004 | Takabayashi et al. |
| 6,777,477 | B1 | 8/2004 | Niume et al. |
| 6,849,328 | B1 | 2/2005 | Marietti et al. |
| 6,974,976 | B2 | 12/2005 | Hollars |
| 2002/0035852 | A1 | 3/2002 | Wang et al. |
| 2003/0177792 | A1 | 9/2003 | Longobardo et al. |
| 2003/0194551 | A1 * | 10/2003 | Sasa et al. ...................... 428/332 |
| 2004/0036993 | A1 * | 2/2004 | Tin ................................. 359/883 |
| 2004/0180216 | A1 | 9/2004 | Veerasamy et al. |
| 2005/0048284 | A1 | 3/2005 | Veerasamy |
| 2005/0095431 | A1 | 5/2005 | Veerasamy |

FOREIGN PATENT DOCUMENTS

| | | |
|---|---|---|
| WO | WO 00/27771 | 5/2000 |
| WO | WO 01/10790 | 2/2001 |
| WO | WO 01/28949 | 4/2001 |
| WO | WO 01/44131 | 6/2001 |
| WO | WO 01/55044 | 8/2001 |

OTHER PUBLICATIONS

Huang, Jow-Lay et al, Annealing Effects on Properites of Antimony Tin Oxide Thin Films Deposited by RJ Reactive Magnetron Sputtering, Surface and Coating Technology, 184 (2004) p. 188-193.*

U.S. Appl. No. 11/194,730, filed Aug. 2, 2005.

U.S. Appl. No. 11/349,346, filed Feb. 8, 2006.

* cited by examiner

METHOD OF MAKING THERMALLY TEMPERED COATED ARTICLE WITH TRANSPARENT CONDUCTIVE OXIDE (TCO) COATING IN COLOR COMPRESSION CONFIGURATION, AND PRODUCT MADE USING SAME

This invention relates to a method of making a thermally tempered coated article including a transparent conductive oxide (TCO) film in a color compression configuration supported by a tempered glass substrate. A coated article, that is thermally tempered and made by such a process, is also provided. Coated articles according to certain example non-limiting embodiments of this invention may be used in applications such as solar cells, oven doors, electrostatic discharge glass, solar control windows, defrosting windows, or other types of windows in certain example instances.

BACKGROUND AND SUMMARY OF EXAMPLE EMBODIMENTS OF INVENTION

Typically, methods of forming TCOs on glass substrates require high glass substrate temperatures. Such methods include chemical pyrolysis where precursors are sprayed onto the glass substrate at approximately 400 to 500 degrees C., and vacuum deposition where the glass substrate is kept at about 150 to 300 degrees C. Unfortunately, TCO films such as $SnO_2$:F (fluorine doped tin oxide) formed on glass substrates by chemical pyrolysis suffer from non-uniformity and thus may be unpredictable and/or inconsistent with respect to certain optical and/or electrical properties.

Sputter deposition of a TCO (transparent conductive oxide) at approximately room temperature would be desirable, given that most float glass manufacturing platforms are not equipped with in-situ heating systems. An additional potential advantage of sputter-deposited TCO films is that they may include the integration of anti-reflection coatings, resistivity reduction, and so forth.

There is often a need to thermally temper coated articles having a glass substrate coated with a TCO film/coating. For instance, in certain applications tempering is required by code (e.g., e.g., for windows over doorways, for windows identified as breakable windows for firemen, and other applications). Thermal tempering typically requires heating the glass substrate with a coating thereon in a tempering furnace at a temperature of at least about 580 degrees C., more preferably at least about 600 degrees C., and often at least about 620 or 640 degrees C. (e.g., for at least about 2 minutes, more preferably for at least about 5 minutes). Thus, it will be appreciated that thermal tempering involves very high temperatures.

Unfortunately, it has been found that glass substrates supporting sputter-deposited TCOs cannot be thermally tempered without the TCOs suffering a significant loss in electrical conductivity. Glass tempering temperatures (see above) of typical sputter-deposited films causes a rapid conductivity drop in certain TCOs (e.g., sputter-deposited zinc oxide inclusive TCOs).

Thus, it will be appreciated that there exists a need in the art for an improved technique or method of tempering glass substrates including a film/coating thereon that can result in an effective and/or efficient tempered glass substrate with a TCO film thereon.

Single layer TCO coatings with large thicknesses (e.g., at least about 2,000 Å thick) formed directly on and contacting glass substrates may also be problematic in certain instances in that they may suffer from significant color non-uniformity. For instance, such a coated article may appear one color (e.g., roughly green) in transmission when looking through the coated article, but may appear reddish or pinkish in color when viewing that coated article based on reflective color at high viewing angles. As another example, such a coated article may have a fairly neutral reflective color at a zero degree (normal) viewing angle, but may appear very reddish at a 45 degree viewing angle. In other words, such coated articles with single layer TCO coatings with large thicknesses may suffer from significant angular color dependence problems.

Thus, it will be appreciated that there exists a need in the art for an improved technique or method of tempering glass substrates including a film/coating thereon that can result in an effective and/or efficient tempered glass substrate with a TCO film thereon, which does not suffer from extreme color non-uniformity.

In certain example embodiments of this invention, a method is provided for making a thermally tempered coated article including a tempered glass substrate with a TCO film thereon. Initially, color compression system including at least first and second layers is deposited by sputtering or the like, on a non-tempered glass substrate. In certain example embodiments, the first layer of the color compression system is a high index (n) layer and is deposited directly on and contacting the glass substrate, and the second layer of the color compression system is a low index (n) layer that is deposited on the glass substrate over the first layer. After the first and second layers of the color compression system have been deposited on the glass substrate, an amorphous metal oxide film is sputter-deposited onto the non-tempered glass substrate over the layers of the color compression system. In certain example embodiments, the sputter-deposited amorphous metal oxide film may be of or include an oxide of Sn and/or Sb (e.g., $SnO_x$:Sb). As sputter-deposited, the amorphous metal oxide film is rather high with respect to visible light absorption, has a high sheet resistance (i.e., not truly conductive), and is amorphous.

Then, the glass substrate with the amorphous film and the color compression system thereon is thermally tempered. The thermal tempering typically involves heating the glass substrate with the amorphous film and the color compression system thereon in a tempering furnace at a temperature of at least about 580 degrees C., more preferably at least about 600 degrees C., and often at least about 620 or 640 degrees C. The glass substrate with the layers thereon may be in the tempering furnace for at least about 2 minutes, more preferably for at least about 5 minutes, in certain example embodiments of this invention. The thermal tempering causes at least the amorphous non-conductive film to be transformed into a crystalline transparent conductive oxide (TCO) film. In other words, the heat used in the thermal tempering of the glass substrate causes the amorphous film to turn into a crystalline film, causes the visible transmission of the film to increase, and causes the film to become electrically conductive. In short, the thermal tempering activates at least the top layer of the layer stack.

The color compression system, including the first and second layers thereof, provided between the glass substrate and the TCO film reduces color non-uniformity characteristics of the coated article compared to if the color compression system were not present. For example, in certain example embodiments of this invention, the color compression system permits the coated article to realize a more uniform and more consistent color at both normal and off-axis viewing angles, even in the situation where a rather thick (e.g., from about 1,000 to 10,000 Å thick, more preferably from about 2,000 to 10,000 Å thick, and most preferably from about 3,000 to 8,000 Å thick) TCO is the top layer of the layer stack. In general, a more neutral colored coated article can be provided.

In certain example embodiments of this invention, the amorphous film prior to tempering and the crystalline TCO (e.g., the top layer of the layer stack) following tempering may be of or include $SnO_x:Sb$ (x may be from about 0.5 to 2, more preferably from about 1 to 2, and sometimes from about 1 to 1.95). The film may be oxygen deficient (substoichiometric in certain instances). The Sn and Sb may be co-sputtered in an oxygen inclusive atmosphere (e.g., a mixture of oxygen and argon) to form the film in certain example embodiments of this invention, with the Sb being provided to increase conductivity of the crystalline film following tempering. In certain example embodiments, the Sb is provided for doping purposes, and can make up from about 0.001 to 30% (weight %) of the amorphous and/or crystalline metal oxide film (from preferably from about 1 to 15%, with an example being about 8%). If the Sb content is higher than this, the lattice is disturbed too much and mobility of electrons is also disturbed thereby hurting conductivity of the film, whereas if less than this amount of Sb is provided then the conductivity is not as good in the crystalline film.

In certain example embodiments of this invention, there is provided a method of making a thermally tempered coated article including a transparent conductive film on a tempered glass substrate, the method comprising: providing a glass substrate; sputter-depositing a high index layer having a high refractive index on the glass substrate, and then sputter-depositing a low index layer having a low refractive index on the glass substrate over at least the high index layer; after the high index layer and the low index layer have been sputter-deposited on the glass substrate, sputter-depositing an amorphous film on the glass substrate over each of the high index layer and the low index layer; thermally tempering the glass substrate with the amorphous film, the low index layer, and the high index layer thereon; and wherein heat used in said tempering causes at least the amorphous film to transform into a crystalline film, and wherein the crystalline film is transparent to visible light and electrically conductive following said tempering. The color compression system may be made up of at least the high and low index layers.

In other example embodiments of this invention, there is provided a method of making a thermally tempered coated article including a transparent conductive film on a tempered glass substrate, the method comprising: providing a glass substrate; forming a high index layer having a high refractive index on the glass substrate, and a low index layer having a low refractive index on the glass substrate over at least the high index layer; after the high index layer and the low index layer have been formed, forming an amorphous film comprising a metal oxide on the glass substrate over each of the high index layer and the low index layer; thermally tempering the glass substrate with the amorphous film, the low index layer, and the high index layer thereon; and wherein heat used in said tempering causes at least the amorphous film to transform into a film which is substantially transparent and electrically conductive.

In still further example embodiments of this invention, there is provided a coated article comprising: a thermally tempered glass substrate; a high index layer having a high refractive index provided on the glass substrate, and a low index layer having a low refractive index provided on the glass substrate over at least the high index layer; and a crystalline transparent conductive film comprising a metal oxide supported by at least the tempered glass substrate and provided over at least the high index layer and the low index layer, wherein the crystalline transparent conductive film comprises an oxide of Sn and Sb.

In certain example embodiments of this invention, there is provided a method of making a thermally tempered coated article including a transparent conductive film on, directly or indirectly, a tempered glass substrate, the method comprising: providing a glass substrate; sputter-depositing an amorphous film comprising Sn and Sb on the glass substrate (directly or indirectly); thermally tempering the glass substrate with the amorphous film comprising Sn and Sb thereon; and wherein heat used in said tempering causes the amorphous film to transform into a crystalline film, and wherein the crystalline film is transparent to visible light and electrically conductive.

DETAILED DESCRIPTION OF EXAMPLE EMBODIMENTS OF THE INVENTION

Coated articles including conductive layer(s) according to certain example non-limiting embodiments of this invention may be used in applications such as solar cells, oven doors, defrosting windows, electrostatic discharge glass, display applications, solar control windows, or other types of windows in certain example instances. For example and without limitation, the transparent conductive layers discussed herein may be used as electrodes in solar cells, as heating layers in defrosting windows, as solar control layers in windows, as reflective layers in oven doors, and/or the like.

Figure 1A:
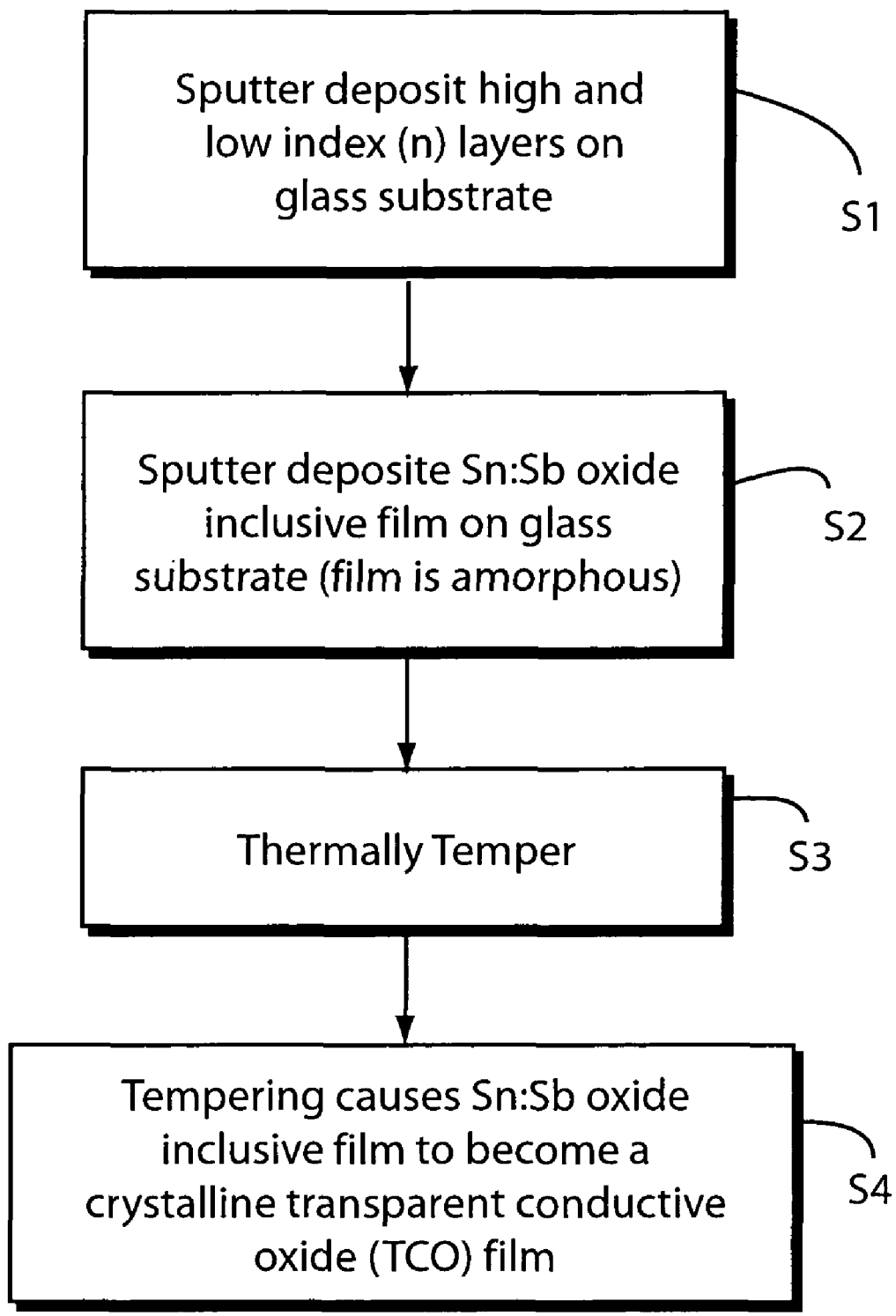
FIG. 1(a) is a flowchart illustrating a method of making a thermally tempered coated article according to an example embodiment of this invention.
Figure 1B:
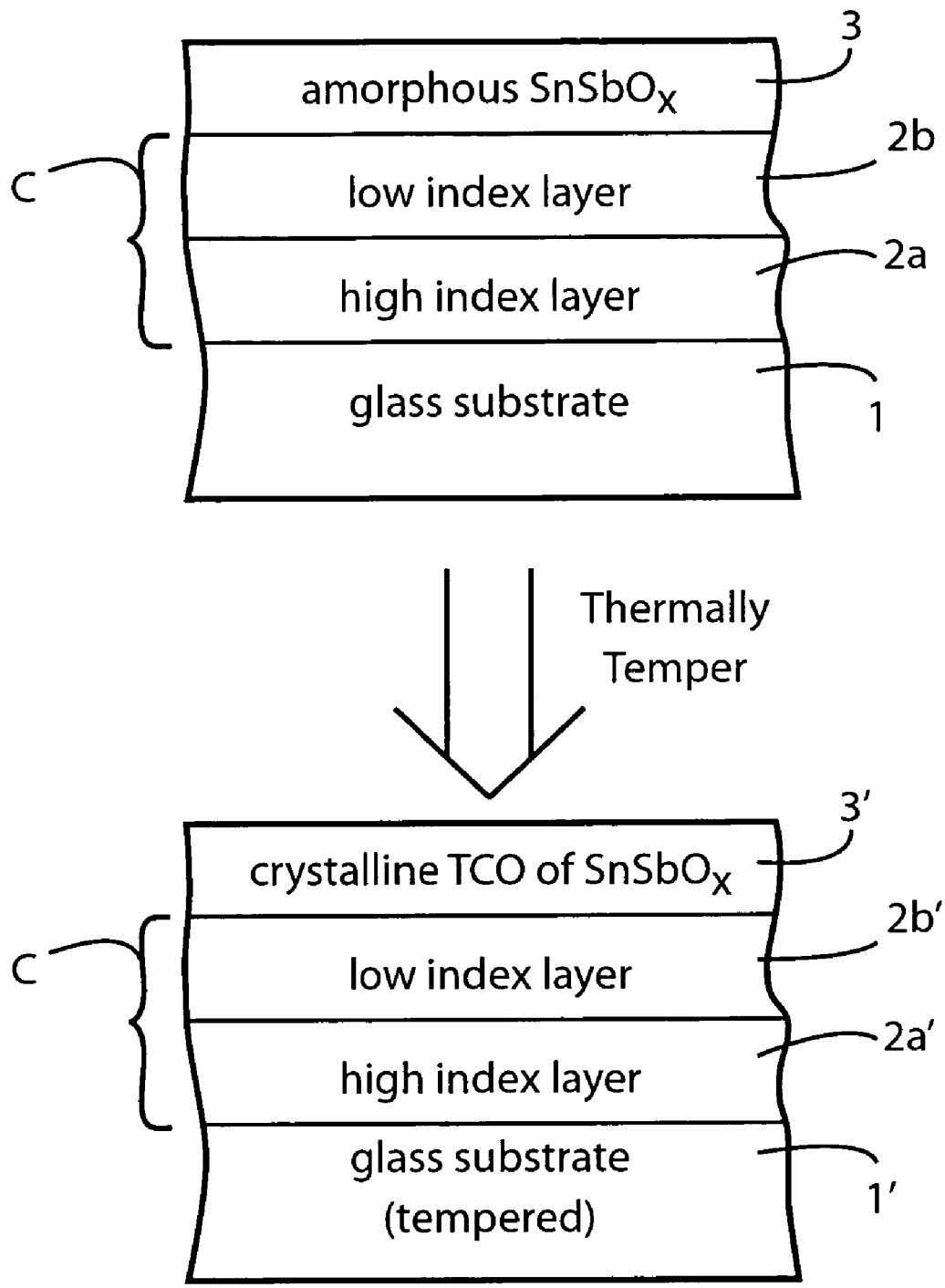
FIG. 1(b) is a schematic diagram illustrating the method of FIG. 1(a) using cross sectional views according to an example embodiment of this invention.

FIG. 1(a) is a flowchart illustrating certain steps performed in making a coated article according to an example embodiment of this invention, whereas FIG. 1(b) illustrates this example embodiment in terms of a cross sectional schematic view.

Referring to FIGS. 1(a)-1(b), an example of this invention will be described. Initially, a color compression system (C) including at least first and second layers (2a and 2b) is deposited by sputtering or the like, on a non-tempered glass substrate 1 (S1 in FIG. 1(a)). In certain example embodiments, the first layer 2a of the color compression system C is a high index (n) layer and is deposited directly on and contacting the glass substrate 1, and the second layer 2b of the color compression system C is a low index (n) layer that is deposited on the glass substrate 1 over the first layer 2a.

In certain example embodiments of this invention, the first layer 2a of the color compression system C has a high refractive index ("n" in the range of from 400-700 nm) of from about 1.7 to 2.4 (more preferably from about 1.8 to 2.2) and a thickness (d) of from about 100 to 500 Å, with example values being n equals about 1.85 and d equals about 300 Å. In like certain example embodiments of this invention, the second layer 2b of the color compression system C has a low refractive index ("n" in the range of from 400-700 nm) of from about 1.3 to 1.6 (more preferably from about 1.35 to 1.45) and a thickness (d) of from about 100 to 500 Å, with example values being n equals about 1.4 and d equals about 220 Å. In any event, the second layer 2b of the color compression system C has a low refractive index (n) than does the first layer 2a of the color compression system.

For purposes of example and without limitation, example materials which may be used for making the first high index layer 2a of the color compression system include tin oxide, zinc oxide, indium-tin-oxide, titanium oxide, and silicon oxynitride tuned to have a high index (n); these materials may be sputter-deposited on the glass substrate 1. The first high index layer 2a may or may not be a TCO in different example embodiments of this invention. When the first high index layer 2a is made of titanium oxide (e.g., $TiO_2$) for example, it need not be a TCO and instead is typically a dielectric layer. However, in an alternative embodiment where the first high index layer 2a is made of indium-tin-oxide (ITO), it may be a TCO. In another example embodiment, the first high index layer 2a may initially be sputter-deposited an as amorphous layer of or including oxide(s) of Sn and/or Sb on the glass substrate, and then thermal tempering of the glass substrate with the amorphous layer thereon may cause the amorphous film 2a to transform into a crystalline TCO film. For purposes of example and without limitation, silica (e.g., $SiO_2$) is an example material which may be used for making the second low index layer 2b of the color compression system C in certain example embodiments of this invention, although other low index materials may instead be used.

After the first and second layers (2a and 2b) of the color compression system C have been sputter-deposited on the glass substrate 1, an amorphous metal oxide film 3 is sputter-deposited onto the non-tempered glass substrate 1 (S2 in FIG. 1(a)). Note that it is possible that other layer(s) may additionally be provided on the substrate 1 under film 3 in certain instances. The film 3 is considered "on" and "supported by" the substrate 1 regardless of whether other layer(s) are provided therebetween. In certain example embodiments, the sputter-deposited amorphous metal oxide film 3 may be of or include an oxide of Sn and/or Sb (e.g., $SnO_x$:Sb). As sputter-deposited, the metal oxide film 3 may have a visible light transmission of less than 70%, may have a rather high sheet resistance (i.e., not be truly conductive), and may be amorphous. In certain example embodiments, a Sn and/or Sb sputtering target(s) may be used to sputter the film 3 on the substrate in a sputtering atmosphere including argon and oxygen gas. In certain example embodiments of this invention, the amorphous film 3 may have an index (n) of from about 1.8 to 2.2, and may be from about 1,000 to 10,000 Å thick, more preferably from about 2,000 to 10,000 Å thick, and most preferably from about 3,000 to 8,000 Å thick (the film 3' following HT may also have such a thickness and refractive index).

After the film 3 has been deposited, the glass substrate 1 with the amorphous film 3 and the color compression system (2a, 2b) thereon is thermally tempered (S3 in FIG. 1(a)). The thermal tempering typically involves heating the glass substrate 1 with the color compression system (2a, 2b) and the amorphous film 3 thereon in a tempering furnace at a temperature of at least about 580 degrees C., more preferably at least about 600 degrees C., and often at least about 620 or 640 degrees C. The glass substrate 1 with at least the layers 2a, 2b and 3 thereon may be in the tempering furnace for at least about 2 minutes, more preferably for at least about 5 minutes, in certain example embodiments of this invention. The heat used during the thermal tempering causes the amorphous non-conductive film 3 to be transformed into a crystalline transparent conductive oxide (TCO) film 3' (S4 in FIG. 1(a)). In other words, the heat used in the thermal tempering of the glass substrate 1 causes at least the amorphous film 3 to turn into a crystalline film 3', causes the visible transmission of the film to increase (e.g., to a level above 70%), and causes the film to become electrically conductive. In short, the thermal tempering activates the film so that TCO film 3' is provided, typically as the outermost or uppermost layer of the coating, following the tempering.

In certain example embodiments, the thermal tempering causes the visible transmission of the film 3 to increase by at least about 5%, more preferably by at least about 10%. In certain example embodiments, the thermal tempering causes the sheet resistance ($R_s$) of the film 3 to drop by at least about 20 ohms/square, more preferably by at least about 50 ohms/square, and most preferably by at least about 100 ohms/square. Electrical conductivity can be measured in terms of sheet resistance ($R_s$). The TCO films 3' discussed herein (following the tempering) have a sheet resistance ($R_s$) of no greater than about 200 ohms/square, more preferably no greater than about 100 ohms/square, and most preferably from about 5-100 ohms/square. In certain example embodiments, conductivity can be caused by creating nonidealities or point defects in crystal structure of a film to generate electrically active levels thereby causing its sheet resistance to drop significantly into the range discussed above. This can be done by using an oxygen deficient atmosphere during crystal growth and/or by doping (e.g., with Sb).

It is noted that following tempering, the layers 2a' and 2b' of the color compression system C are typically dielectric layers. For instance, in the case where titanium oxide was used as layer 2a, following tempering layer 2a' is of titanium oxide (e.g., $TiO_2$) and is a dielectric. Likewise, in the case where silicon oxide (which may be doped with Al or the like) was used as low index layer 2b, following tempering layer 2b' is still primarily of silicon oxide (e.g., $SiO_2$) and is a dielectric. However, in an alternative embodiment, the first high index layer 2a may be made of indium-tin-oxide (ITO), and may still be made primarily of ITO after thermal tempering (layer 2a') and be a TCO before and/or after tempering. In yet another example embodiment, the first high index layer 2a may initially be sputter-deposited an as amorphous layer of or including oxide(s) of Sn and/or Sb (e.g., in an oxygen and argon gas atmosphere) on the glass substrate, and then thermal tempering of the glass substrate with the amorphous layer thereon may cause the amorphous layer 2a to transform into a crystalline TCO layer 2a'.

After the glass substrate 1' with the layer stack thereon exits the tempering furnace, the glass 1 is permitted to cool in a known manner thereby resulting in the thermal tempering thereof and thus a thermally tempered glass substrate 1' with a layer stack (2a', 2b' and 3') thereon. Thus, a thermally tempered glass substrate 1' has been provided with at least one TCO film 3' thereon. In certain example embodiments, the TCO film 3' is the outermost layer of the layer stack on the tempered glass substrate 1'. The tempered coated article may then be used in monolithic window applications, oven door applications, IG window unit applications, solar cells, heatable window applications, or the like. The TCO 3' may function as a heatable layer/coating (when voltage is applied thereacross) in certain applications such as heatable window applications, or alternatively may function as a heat or IR blocking layer/coating in applications such as oven doors, or alternatively may function as an electrode in applications such as solar cell applications. In certain example embodiments of this invention, the coated article before and/or after tempering has a visible transmission of at least about 30%, more preferably of at least about 50%, and even more preferably of at least about 70%.

In the final tempered product, the color compression system, including the first and second layers 2a' and 2b' thereof, provided between the glass substrate 1' and the TCO film 3' reduces color non-uniformity characteristics of the coated article compared to if the color compression system were not present. For example, in certain example embodiments of this invention, the color compression system permits the coated article to realize a more uniform and more consistent color at both normal and off-axis viewing angles, even in the situation where a rather thick (e.g., from about 1,000 to 10,000 Å thick, more preferably from about 2,000 to 10,000 Å thick, and most preferably from about 3,000 to 8,000 Å thick) TCO film 3' is the top layer of the layer stack. In general, a more neutral colored coated article can be provided.

In certain example embodiments of this invention, the amorphous metal oxide film 3 prior to tempering and the crystalline TCO film 3' following tempering may be of or include $SnO_x$:Sb (x may be from about 0.5 to 2, more preferably from about 1 to 2, and sometimes from about 1 to 1.95). The film may be oxygen deficient in certain example embodiments (substoichiometric in certain instances). The Sn and Sb may be co-sputtered in an oxygen inclusive atmosphere (e.g., a mixture of oxygen and argon) to form the amorphous metal oxide film 3 in certain example embodiments of this invention, with the Sb being provided to increase conductivity of the crystalline film following tempering. The co-sputtering to form metal oxide film 3 may be performed by sputtering a ceramic target(s) of $SnSbO_x$ in certain example embodiments of this invention (e.g., in a gaseous atmosphere include argon and/or oxygen gas); or alternatively the co-sputtering may be performed by sputtering a SnSb target(s) in an atmosphere including argon, oxygen and possibly fluorine gases. In certain example embodiments, the Sb is provided for doping purposes, and can make up from about 0.001 to 30% (weight %) of the amorphous and/or crystalline metal oxide film (from preferably from about 1 to 15%, with an example being about 8%). If the Sb content is higher than this, the lattice is disturbed too much and mobility of electrons is also disturbed thereby hurting conductivity of the film, whereas if less than this amount of Sb is provided then the conductivity is not as good in the crystalline film. In certain example embodiments of this invention, the amorphous 3 and/or crystalline film 3' has a Sn content of from about 20-95%, more preferably from about 30-80%. It is also possible from amounts of aluminum to be used in the film 3, 3'.

Figure 2:
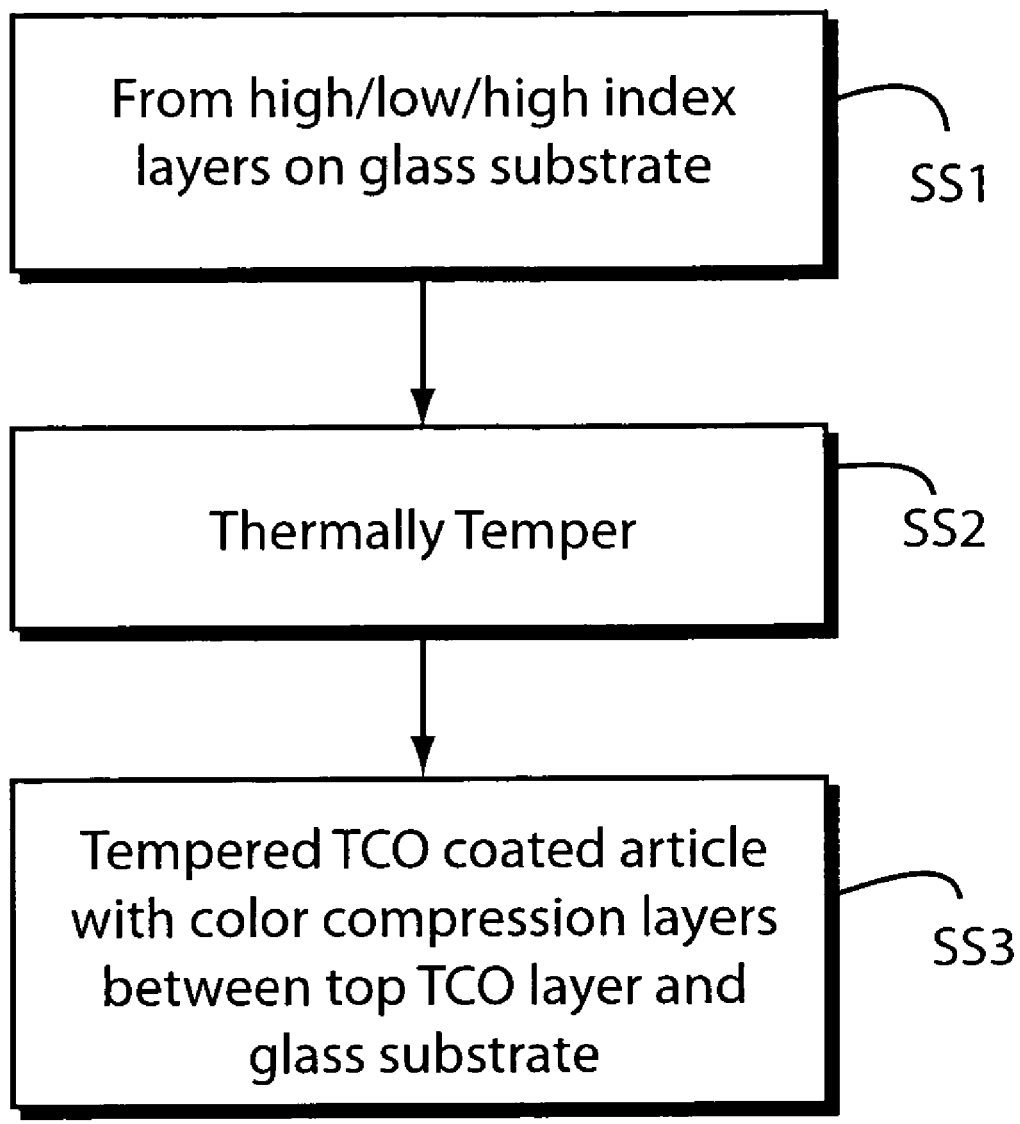
FIG. 2 is a flowchart illustrating a general method of making a thermally tempered coated article according to another example embodiment of this invention.

While the TCO film 3' in the FIG. 1(a)-1(b) embodiments may be made of an oxide of Sn:Sb, this invention is not so limited. For example and without limitation, the TCO film 3' may be any of the TCO films described in any of U.S. Ser. Nos. 11/194,730, 11/173,157, or 11/349,346, the disclosures of all of which are hereby incorporated herein by reference. In this respect, FIG. 2 is a more generalized flowchart illustrating an example embodiment of this invention. Initially, in step SS1, a color compression system including at least a high index layer (e.g., 2a) and a low index layer (e.g., 2b) is deposited, such as by sputtering, on a glass substrate 1. A film to be a TCO is then deposited on the color compression system, via sputtering or the like. The film to be the TCO may or may not be a TCO as initially deposited. Then, in step SS2, the coated article with the color compression system and the film to be the TCO thereon is heat treated for thermal tempering. Following tempering, the coated article includes the color compression system including at least a high index layer (e.g., 2a') and a low index layer (e.g., 2b'), and a TCO film 3' of any suitable TCO material on the tempered glass substrate 1' (see step SS3 in FIG. 2).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Moreover, it is possible to form other layer(s) over the film 3 (or 3') in certain example embodiments of this invention. In certain example embodiments, an anti-reflection coating may be provided on top of the layer 3 (or 3'). In other example embodiments of this invention, the Sb may be omitted from film 3 and/or 3', or another dopant(s) may be used instead of or in addition to the Sb in the film.

The invention claimed is:

1. A method of making a thermally tempered coated article including a transparent conductive film on a tempered glass substrate, the method comprising:
    providing a glass substrate;
    sputter-depositing a high index layer having a high refractive index on the glass substrate, and then sputter-depositing a low index layer having a low refractive index on the glass substrate over at least the high index layer;
    after the high index layer and the low index layer have been sputter-deposited on the glass substrate, sputter-depositing an amorphous film on the glass substrate over each of the high index layer and the low index layer;
    thermally tempering the glass substrate with the amorphous film, the low index layer, and the high index layer thereon; and
    wherein heat used in said tempering causes at least the amorphous film to transform into a crystalline film, and wherein the crystalline film is transparent to visible light and electrically conductive following said tempering.

2. The method of claim 1, wherein the amorphous film comprises at least an oxide of Sn and Sb, and wherein following the tempering the crystalline film comprises an oxide of Sn and Sb.

3. The method of claim 1, wherein the crystalline film comprises an oxide of Sn and Sb.

4. The method of claim 1, wherein the low index layer has a refractive index of from about 1.3 to 1.6, and the high index layer has a refractive index of from about 1.7 to 2.4.

5. The method of claim 1, wherein the low index layer has a refractive index of from about 1.35 to 1.45, and the high index layer has a refractive index of from about 1.8 to 2.2.

6. The method of claim 1, wherein each of the low index layer and the high index layer have a thickness of from about 100 to 500 angstroms.

7. The method of claim 1, wherein the low index layer comprises an oxide of silicon.

8. The method of claim 1, wherein the high index layer comprises at least one of titanium oxide, tin oxide, and zinc oxide.

9. The method of claim 1, wherein following the tempering the low index layer is a dielectric layer, and the high index layer is a dielectric layer or a transparent conductive layer.

10. The method of claim 1, wherein following the tempering the low index layer is a dielectric layer, and the high index layer is a transparent conductive layer.

11. The method of claim 1, wherein after the tempering the low index layer is located between and directly contacting each of the high index layer and the crystalline film.

12. The method of claim 1, wherein the heat used in said tempering causes sheet resistance of the film to decrease by at least about 20 ohms/square.

13. The method of claim 1, wherein the heat used in said tempering causes sheet resistance of the film to decrease by at least about 50 ohms/square.

14. The method of claim 1, wherein the crystalline film has a sheet resistance of no greater than about 200 ohms/square.

15. The method of claim 1, wherein the crystalline film has a sheet resistance of no greater than about 100 ohms/square.

16. The method of claim 1 wherein the crystalline film comprises an oxide of Sn, and wherein Sb content of the crystalline film is from about 0.001 to 30%.

17. The method of claim 1 wherein the crystalline film comprises an oxide of Sn, and wherein Sb content of the crystalline film is from about 1 to 15%.

18. The method of claim 1, wherein the crystalline film comprises $SnO_x$:Sb and is at least about 70% transparent to visible light.

19. The method of claim 1, wherein following tempering the coated article has a visible transmission of at least about 70%.

20. A method of making a thermally tempered coated article including a transparent conductive film on a tempered glass substrate, the method comprising:

providing a glass substrate;

forming a high index layer having a high refractive index on the glass substrate, and a low index layer having a low refractive index on the glass substrate over at least the high index layer;

after the high index layer and the low index layer have been formed, forming an amorphous film comprising a metal oxide on the glass substrate over each of the high index layer and the low index layer;

thermally tempering the glass substrate with the amorphous film, the low index layer, and the high index layer thereon; and wherein heat used in said tempering causes at least the amorphous film to transform into a film which is substantially transparent and electrically conductive.

21. The method of claim 20, wherein the crystalline film comprises an oxide of Sn and Sb.

22. The method of claim 20, wherein the low index layer has a refractive index of from about 1.3 to 1.6, and the high index layer has a refractive index of from about 1.7 to 2.4.

* * * * *